Figure 1A:
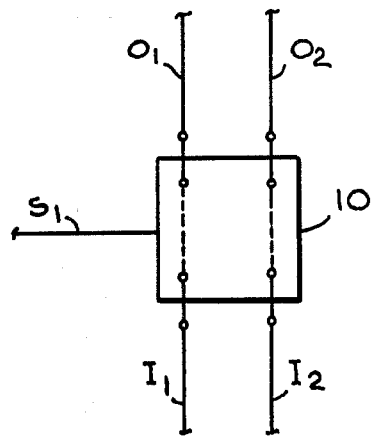

United States Patent [19]

Osheroff et al.

[11] 4,037,622
[45] July 26, 1977

[54] DIAPHRAGM REVERSING VALVE

[75] Inventors: Gene W. Osheroff, Las Vegas, Nev.; Laurence McGann, Los Angeles, Calif.

[73] Assignee: McQuay-Perfex Inc., Minneapolis, Minn.

[21] Appl. No.: 205,500

[22] Filed: Dec. 7, 1971

[51] Int. Cl.$^2$ .............................................. F16K 11/10
[52] U.S. Cl. .................................... 137/597; 251/61.1
[58] Field of Search .............. 137/597, 596.15, 596.16; 251/61.1

[56] References Cited

U.S. PATENT DOCUMENTS

| | | | |
|---|---|---|---|
| 2,865,402 | 12/1958 | Miller | 137/597 X |
| 2,911,005 | 11/1959 | Adelson | 137/596.15 |
| 2,984,257 | 5/1961 | McCormick et al. | 137/596.15 |
| 3,080,887 | 3/1963 | Brandenberg | 137/596.14 |

Primary Examiner—Robert G. Nilson

Attorney, Agent, or Firm—Merchant, Gould, Smith, Edell, Welter & Schmidt

[57] ABSTRACT

In the present invention, four valves are connected in tandem to form a closed loop. A pair of inlet channels and a pair of outlet channels are connected between the valves and in such a manner as to form a bridge-circuit arrangement. The valves are preferably disc-shaped chambers with orifices in their rooves by means of which they interconnect with one another. In each valve is also located a diaphragm resting on the floor of the valve chamber and which may be raised and pressed against the roof of the chamber to cover the orifices there, thereby closing that particular valve. By thusly closing one pair of diagonally opposing valves or the other, the connections between the inlet and outlet channels can be reversed. The diaphragms can be raised by applying a relatively high pressure to their undersides through orifices located in the floors of their respective valve chambers.

4 Claims, 4 Drawing Figures

U.S. Patent  July 26, 1977  4,037,622

DIAPHRAGM REVERSING VALVE

The present invention relates to valves in general and more particularly relates to a valve bridge by means of which connections between channels in a system can be reversed.

In systems involving gas-flow and gas-pressure situations, it is oftentimes desirable, if not necessary, with changing conditions, to reverse the connections of channels through which the gas or gases flow or through which the pressures are applied. The present invention provides an apparatus for such a purpose and, therefore it is an object of the present invention to provide a valve apparatus by means of which a reversal of the connections between one pair of channels and another pair of channels through which gases flow or gas pressures applied can be automatically and quickly effected without any significant interruption in operation.

It is another object of the present invention to provide a combination of valves arranged to form a bridge circuit by means of which the flow of gases or the gas pressures applied to a pair of channels can be reversed.

It is a further object of the present invention to provide a valve apparatus that is operable in response to gaspressure signals to reverse the flow of gases or the gas pressures applied to a pair of channels.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1B:
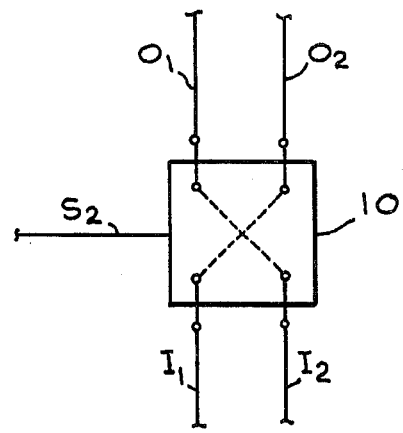
Figure 2:
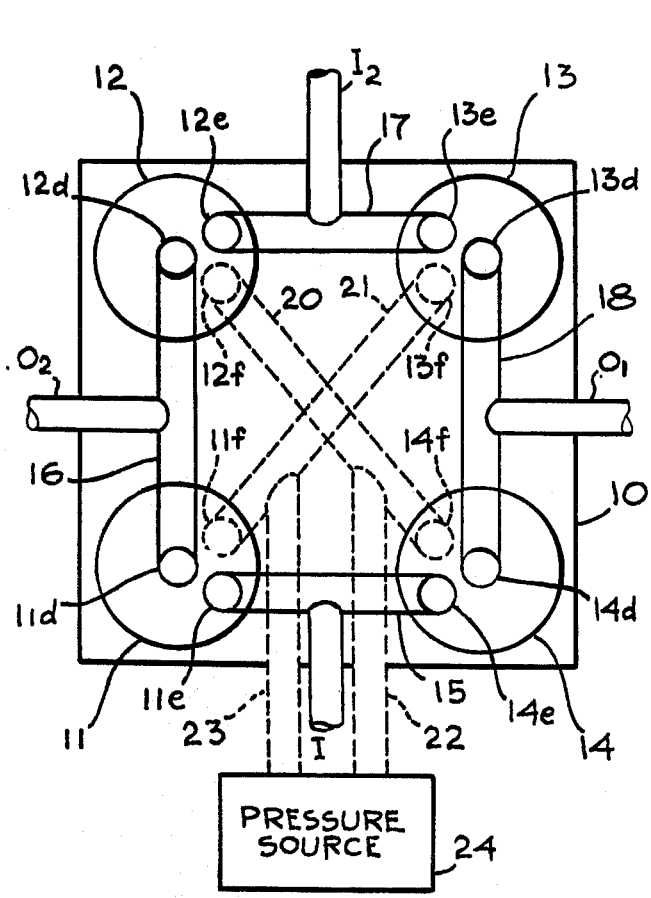
Figure 3:
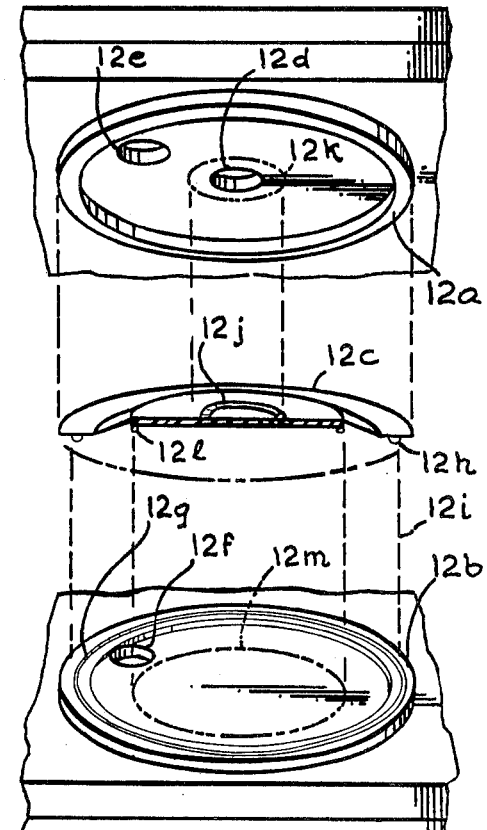

FIGS. 1(a) and 1(b) are schematic circuit diagrams illustrating the basic purposes and principles of a valve apparatus according to the present invention;

FIG. 2 is a diagram illustrating the basic structure of a preferred embodiment of a valve apparatus according to the present invention; and FIG. 3 is an exploded view showing in detail one of the valves in the FIG. 2 apparatus.

For an understanding of the invention, reference is now made to FIGS. 1(a) and 1(b) of the drawing wherein the basic concept of the invention is depicted. Reversing valve apparatus according to the present invention is designated therein as 10, inlet channels leading into apparatus 10 and through which gases are fed or gas pressures applied to it are designated $I_1$ and $I_2$, and outlet channels leading out of apparatus 10 are designated $O_1$ and $O_2$. As shown in FIG. 1(a), in response to a gas-pressure signal $S_1$, apparatus 10 respectively interconnects inlet channels $I_1$ and $I_2$ to outlet channels $O_1$ and $O_2$. In this instance, therefore, any gas flowing in inlet channel $I_1$ enters outlet channel $O_1$, and the same is true with respect to channels $I_2$ and $O_2$. On the other hand, FIG. 1(b) shows what happends when a gas-pressure signal $S_2$ is applied to apparatus 10. In this latter instance, the connections between the inlet and outlet channels are reversed, that is to say, inlet channel $I_1$ is now connected to outlet channel $O_2$ and, similarly, inlet channel $I_2$ is now connected to outlet channel $O_1$. In both figures, within the block designated as apparatus 10, the broken lines indicate the above-described connections between the channels.

Considering now the invention in greater detail, reference is made to FIG. 2 wherein a preferred embodiment of a diaphragm reversing valve according to the present invention is shown to basically include a plurality of four valves, respectively designated 11–14, that are connected to one another in series or, stated differently, in tandem by a corresponding plurality of four flow channels respectively designated 15–18. Inlet channels $I_1$ and $I_2$ respectively connect to flow channels 15 and 17 whereas outlet channels $O_1$ and $O_2$ respectively connect to flow channels 18 and 16, with the result, as will be recognized by those skilled in the art, that valves 11–14, flow channels 15–18, inlet channels $I_1$ and $I_2$, and outlet channels $O_1$ and $O_2$ combine to form a bridge-circuit arrangement. Finally, the embodiment includes still another pair of flow channels 20 and 21, sometimes hereinafter referred to as control channels, and still another pair of inlet channels 22 and 23, control channels 20 and 21 respectively interconnecting the two pairs of diagonally opposing valves shown in FIG. 2. Thus, control channel 20 interconnects valves 12 and 14 and control channel 21 interconnects valves 11 and 13. As for inlet channels 22 and 23, these are connected between control channels 20 and 21, respectively, and a pressure source 24 that produces the signals $S_1$ and $S_2$ mentioned earlier in connection with FIGS. 1(a) and 1(b).

Valves 11–14 are preferably identical to one another and, as can be seen from FIG. 3 wherein one of the valves is shown in greater detail, each resembles a disc-shaped chamber. For sake of convenience and clarity, the valve shown in FIG. 3 and to be described hereinbelow shall be considered to be valve 12 in FIG. 2, but it will be understood that the description is equally applicable to all the valves. Accordingly, referring to FIG. 3, valve 12 therein basically includes a roof member 12a, a floor member 12b, and a diaphragm 12c. Members 12a and 12b are disc-shaped and recessed, with the result that when they are put together, one upon the other and sealed, they form the aforesaid disc-shaped valve chamber. Needless to say, diaphragm 12c is positioned between members 12a and 12b.

Roof member 12a has two orifices through it designated 12d and 12e and although one orifice is shown located at the center of the member and the other is shown located at its outer periphery, it must be emphasized that the actual location of these orifices is relatively unimportant, that is to say, that their location is merely a matter of design. Floor member 12b also has a circular crevice or recess 12g located in its rim and the function of this recess is to properly locate and hold or, stated differently, to properly seat diaphragm 12c when it is on the floor of the valve chamber. In this regard, diaphragm 12c has a circular lip 12h integral with its underside, which, as shown by the broken lines 12i, fits into recess 12g and thereby helps to seat the diaphragm. The diaphragm includes another circular lip 12j that is centered on its top surface, the lip enclosing orifice 12d, as shown by broken line 12k, when the diaphragm is pressed against the roof of the valve. Finally, although not essential, diaphragm 12c also includes another circular lip 12l centered on its underside, lip 12l making contact with the floor of the valve, as shown by broken line 12m, when the diaphragm is seated on member 12b. The function of lip 12l is to facilitate the separation of the diaphragm from the surface of member 12b when the operation calls for such a separation.

Considering now the operation of the FIG. 3 valve, which is the operation of all the valves, it will initially be assumed that no gas pressure is being applied to the underside of diaphragm 12c which, when applied, is applied through orifice 12f. Accordingly, diaphragm 12c is on the floor of the valve, that is to say, it is seated on member 12b, with the result that orifices 12d and 12e are uncovered or exposed which, in turn, means that any gas flowing through one will thereafter flow through the other. Under such circumstances, the valve is said to be "open". If, now, a gas pressure is applied through orifice 12f and exerted on the underside of diaphragm 12c, the diaphragm is raised from member 12b and pressed against the roof of the valve chamber, that is to say, against the undersurface of member 12a, thereby covering over or otherwise closing at least one of the two orifices there. More specifically, with diaphragm 12c raised against roof member 12a, orifice 12d is covered over in an airtight manner and, in the subject embodiment, so is orifice 12e. When one or both of these orifices are closed in the manner described, there can be no flow between them and the valve is then said to be "closed". When the gas pressure that raised diaphragm 12c is removed, the diaphragm falls back to member 12b and again becomes seated there, with the result that the valve is now open once again.

Before applying the FIG. 3 teachings to the apparatus shown in FIG. 2, it should be mentioned that flow channel 16 intercouples valves 11 and 12 via orifices 11d and 12d, that flow channel 17 intercouples valves 12 and 13 via orifices 12e and 13e, that flow channel 18 intercouples valves 13 and 14 via orifices 13d and 14d and, finally, that flow channel 15 intercouples valves 11 and 14 via orifices 11e and 14e. All of the orifices mentioned are in the rooves of the several valves, just as is shown in FIG. 3 and described in connection therewith. It should also be mentioned that orifices 11f–14f are respectively in the floors of valves 11–14, and that control channel 20 intercouples valves 12 and 14 via orifices 12f and 14f while control channel 21 intercouples valves 11 and 13 via orifices 11f and 13f. Of course, although not shown in FIG. 2, each of the valves therein includes a diaphragm of the kind shown in FIG. 3 that is interposed between its roof and floor members. It should finally also be mentioned that pressure source 24 is of the kind that applies either of two different pressure signals to inlet channels 22 and 23, one signal $S_1$ comprising a low pressure on inlet channel 22 and a high pressure on inlet channel 23 and the other signal $S_2$ comprising just the reverse, namely, a high pressure on inlet channel 22 and a low pressure on inlet channel 23.

Considering now the operation of the FIG. 2 apparatus, when signal $S_1$ is applied to inlet channels 22 and 23, the low pressure on inlet channel 22 is applied through control channel 20 and orifices 12f and 14f to the underside of the diaphragms in valves 12 and 14, the effect thereof being that the diaphragms are kept seated on the floors of these valves. On the other hand, the high pressure on inlet channel 23 is applied through control channel 21 and orifices 11f and 13f to the underside of the diaphragms in valves 11 and 13, the effect thereof being that the diaphragms are thereby raised to and pressed against the rooves of these valves.

In consequence of the above and in accordance with the descriptive material presented hereinabove, valves 11 and 13 are closed and valves 12 and 14 are open. Accordingly, any gas entering inlet channel $I_1$ flows into flow channel 15 and from there into and through valve 14 to flow channel 18 where it exits via outlet channel $O_1$. By tracing the path between inlet channel $I_2$ and outlet channel $O_2$ in the same way, it would likewise be found that gas flowing into inlet channel $I_2$ will ultimately flow out of outlet channel $O_2$. Thus, when a signal such as signal $S_1$ is applied to apparatus 10, inlet channels $I_1$ and $I_2$ are respectively connected to outlet channels $O_1$ and $O_2$, just as is illustrated in FIG. 1(a).

If, now, instead of signal $S_1$, signal $S_2$ is applied to inlet channels 22 and 23, the high pressure on inlet channel 22 is, as before, applied through control channel 20 and orifices 12f and 14f to the underside of the diaphragms in valves 12 and 14. This time, therefore, the diaphragms in valves 12 and 14 are raised and pressed against the rooves of these valves to effectively close them. On the other hand, due to the fact that the pressure on inlet channel 23 is now relatively low, valves 11 and 13 are open. Thus, when signal $S_2$ is applied, a gas entering inlet channel $I_1$ must now pass through valve 11 since valve 14 is closed and, therefore, must make its exit via outlet channel $O_2$. In the same way, gas flowing in inlet channel $I_2$ can be traced through valve 13 to outlet channel $O_1$. It can therefore be seen that signal $S_2$ reverses the connections between inlet channels $I_1$ and $I_2$ and outlet channels $O_1$ and $O_2$, as illustrated in FIG. 1(b).

Although a particular arrangement of the invention has been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. In a system wherein it is necessary to interconnect first and second inlet channels to first and second outlet channels in either one of two ways, namely, the first and second inlet channels to the first and second outlet channels, respectively, and the first and second inlet channels to the second and first outlet channels, respectively, connection-reversing apparatus mounted between said inlet and outlet channels and coupled to a gas-pressure source adapted to apply a pair of gas-pressure signals thereto, one signal being of higher pressure than the other, said reversing apparatus comprising: first, second, third and fourth valves respectively including first, second, third and fourth chambers and first, second, third and fourth free-floating diaphragms positioned between the rooves and floors of said chambers, the floors of said chambers each having a gas-pressure orifice therethrough and the rooves of said chambers each having first and second conduit orifices therethrough, each of said valves being open when the conduit orifices in the roof thereof are in communication with one another and closed when communications therebetween are interrupted, each of said diaphragms normally resting on the floor of its valve chamber and rising to the roof thereof to interrupt communications between the conduit orifices thereat in response to the application of the higher of the gas-pressure signals to its underside; first, second, third and fourth flow channels extending between said valves to form a closed-loop arrangement in which valves and flow channels are alternately connected in said loop, said first flow channel being connected between the first conduit orifices of said first and second valves, said third flow channel being connected between the first conduit orifices of said third and fourth valves, said second flow channel being connected between the second conduit orifices of said second and third valves, and said fourth flow channel being connected between the second conduit orifices of said first and fourth valves, the first and second outlet channels respectively being connected to said first and third flow channels and the first and second inlet channels respectively being connected to said second and fourth flow channels; and first and second pressure signal channels, said first signal channel being connected between the gas-pressure orifices of said first and third valves and said second signal channel being connected between the gas-pressure orifices of said second and fourth valves, the gas-pressure source being coupled to said first and second signal channels for applying the gas-pressure signals thereto.

2. The reversing apparatus defined in claim 1 wherein the diaphragm in each of said valves includes a lip on its top side adapted to encircle and enclose one of the associated conduit orifices therein to affirmatively interrupt communications between them.

3. Apparatus for connecting a pair of inlet channels to a pair of outlet channels in either of two ways in response to either of two gas-pressure signals, said apparatus comprising: first, second, third and fourth valves respectively including first, second, third and fourth chambers and first, second, third and fourth free-floating diaphragms positioned between the rooves and floors of said chambers, the floors of said chambers each having a gas-pressure orifice there through and the rooves of said chambers each having first and second conduit orifices therethrough, each of said valves being open when the conduit orifices in the roof thereof are in communication with one another and closed when communications therebetween is interrupted, one outlet channel being coupled to the first conduit orifices of said first and second valves, the other outlet channel being coupled to the first conduit orifices of said third and fourth valves, one inlet channel being coupled to the second conduit orifices of said second and third valves, the other inlet channel being coupled to the second conduit orifices of said first and fourth valves, and the gaspressure orifices being coupled to receive the gas pressure signals, each of said diaphragms normally resting on the floor of its chamber and operable in response to one of the signals applied thereto to rise to the roof of its chamber to interrupt communications between the conduit orifices there and thereby close the valve.

4. The apparatus defined in claim 3 wherein each of said diaphragms includes a lip on its top side adapted to encircle and enclose one of the two conduit orifices to affirmatively interrupt communications between them.

* * * * *